US008687524B2

(12) United States Patent
Sun et al.

(10) Patent No.: US 8,687,524 B2
(45) Date of Patent: Apr. 1, 2014

(54) SOFTWARE DEFINED RADIO

(75) Inventors: Yanmeng Sun, Shanghai (CN); Liangliang Hu, Shanghai (CN)

(73) Assignee: NXP, B.V., Eindhoven (NL)

(*) Notice: Subject to any disclaimer, the term of this patent is extended or adjusted under 35 U.S.C. 154(b) by 603 days.

(21) Appl. No.: 12/918,125

(22) PCT Filed: Feb. 18, 2009

(86) PCT No.: PCT/IB2009/050668
§ 371 (c)(1),
(2), (4) Date: Aug. 18, 2010

(87) PCT Pub. No.: WO2009/104144
PCT Pub. Date: Aug. 27, 2009

(65) Prior Publication Data
US 2010/0329156 A1 Dec. 30, 2010

Related U.S. Application Data

(60) Provisional application No. 61/029,896, filed on Feb. 19, 2008.

(51) Int. Cl.
*H04L 12/16* (2006.01)
*G01R 31/08* (2006.01)

(52) U.S. Cl.
USPC .......................................... 370/259; 370/230

(58) Field of Classification Search
USPC ................................................ 370/259, 230
See application file for complete search history.

(56) References Cited

U.S. PATENT DOCUMENTS

| | | | | |
|---|---|---|---|---|
| 7,784,028 B2* | 8/2010 | Luo et al. | | 717/120 |
| 7,856,611 B2* | 12/2010 | Pisek et al. | | 716/117 |
| 2004/0120307 A1* | 6/2004 | Takahashi et al. | | 370/350 |
| 2008/0052397 A1* | 2/2008 | Venkataraman et al. | | 709/226 |
| 2008/0304448 A1* | 12/2008 | Hosein | | 370/329 |
| 2009/0061940 A1* | 3/2009 | Scheinert et al. | | 455/562.1 |

FOREIGN PATENT DOCUMENTS

| | | | | |
|---|---|---|---|---|
| EP | 1404060 | * | 9/2003 | H04L 12/28 |
| EP | 1503603 A2 | | 2/2005 | |
| WO | 99/60715 A1 | | 11/1999 | |
| WO | 01/54300 A2 | | 7/2001 | |

OTHER PUBLICATIONS

3GPP TS 25.221; "3$^{rd}$ Generation Partnership Project: Technical Specification Group Radio Access Network, Physical Channels and Mapping of Transport Chanels Onto Physical Channels (TDD)".

(Continued)

*Primary Examiner* — Mark Rinehart
*Assistant Examiner* — Angel Brockman

(57) ABSTRACT

A multi-protocol, multi-standard, software-defined radio (SDR) includes one or more RF front ends to support each radio frequency band, and a programmable processor that replaces special-purpose hardware for the tuning and demodulation of each radio service. The programmable processor has limited peak processing capabilities, and calculations are made to see if present user terminal assignments will result in processing conflicts that could exceed the peak processing capabilities. In traffic slot applications in particular, any possible simultaneous arrival or overlap of traffic slots from the respective radio services is projected. If conflicts will result from the current user terminal assignments, then those assignments are reshuffled to obtain a non-conflicting result.

20 Claims, 3 Drawing Sheets

(56) References Cited

OTHER PUBLICATIONS

Marojevic, V., et al; "Dynamic Resource Allocation in Softwre-Defined Radio—The Interrelation Between Platform Architecture and Application Mapping";Frequenz 60; 4 Pages (2006).

Mohyeldin, Eiman, et al; "Dynamic Classmarks for SDR Equipment"; PIMRC 2002; IEEE; 5 Pages (2002).

Nicollet, Eric; "E2R Commercial Reconfigurable Radio Equipments: From Advanced Research to Proof-of-Concept and Standardization".

International Search Report PCT/IB2009/050668 (Feb. 18, 2009).

* cited by examiner

SOFTWARE DEFINED RADIO

The present invention relates to software defined radios (SDR's), and in particular to multi-radio systems and multi-tasking SDR's.

A software-defined radio (SDR) processes digitized radio signals with as little hardware as possible to tune to different frequency bands and receive any modulation across a large frequency spectrum. The basic SDR receiver includes a digital signal processor (DSP) preceded by an analog-to-digital converter (ADC) and a radio frequency (RF) front end. The RF front end is needed in most cases because, as of 2007, current ADC technologies are limited to about 40-MHz. So if the particular RF front end used cannot support all the radio bands the SDR will be handling, separate RF front ends and switching will be needed in the design.

The DSP does application specific processing that can replace special-purpose hardware. Changing the programming can change the particular special purpose hardware being emulated. SDR's are especially useful in military and cell phone services, since these must support a wide variety of changing radio protocols in real time. Modern mobile phones, in particular, are being made to simultaneously support WiFi, Bluetooth, and GSM, protocols on their respective frequency bands. SDR design techniques make such applications practical.

More and more features are constantly being introduced into mobile cellular systems. In the beginning, mobile phones only supported voice calls and Short Message Service (SMS) texting. Multi-media Broadcast and Multicast Service (MBMS) is an important feature now included in third generation (3G) enhanced systems.

A single radio system that provides various radio services is defined as a homogeneous multi-radio system. 3G systems that include MBMS are typical. Heterogeneous radio system applications include 3G digital television-handheld (3G+DTV-H).

The homogeneous multi-radio system has some unique advantages over heterogeneous radio systems. For one, it can manage its various radio links under a one control. A homogeneous multi-radio system can optimize, arrange, and balance its different radio links for best performance.

But, user terminals (UE) in multi-radio systems must handle concurrent multiple tasks, and unpredictable computational load peaks. Task conflicts can build up on the user terminal side. A resulting data crash can seriously degrade user terminal performance. The effects of task conflicts can be especially severe in SDR's.

A multi-protocol, multi-standard, software-defined radio (SDR) embodiment of the invention includes one or more RF front ends to support each radio frequency band, and a programmable processor that replaces special-purpose hardware for the tuning and demodulation of each radio service. The programmable processor has limited peak processing capabilities, and calculations are made to see if present user terminal assignments will result in processing conflicts that could exceed the peak processing capabilities. In traffic slot applications in particular, any possible simultaneous arrival or overlap of traffic slots from the respective radio services is projected. If conflicts will result from the current user terminal assignments, then those assignments are reshuffled to obtain a non-conflicting result. The above-described technique provides for more efficient use of SDR resources in multi-radio applications.

Other aspects and advantages of the present invention will become apparent from the following detailed description, taken in conjunction with the accompanying drawings, illustrating by way of example the principles of the invention.

Throughout the description, similar reference numbers may be used to identify similar elements.

Figure 1:
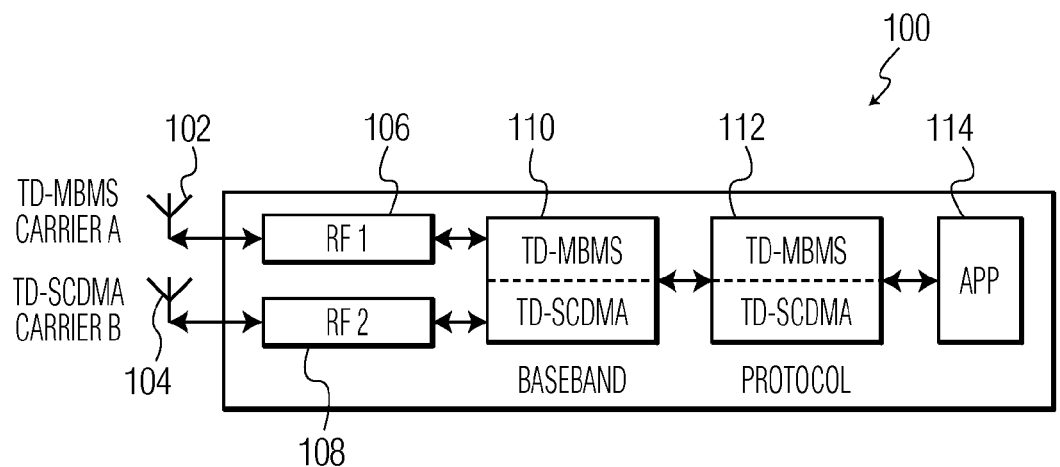
FIG. 1 is a functional block diagram of an multi-protocol, multi-standard, software-defined radio (SDR) user terminal.

FIG. 1 represents a multi-protocol, multi-standard, software-defined radio (SDR) user terminal embodiment of the present invention, and is referred to herein by the general reference numeral 100. SDR user terminal 100, for example, can receive two different radio signals using two different protocols, respectively on antennas 102 and 104 with radio frequency (RF) front ends (RF1) 106 and (RF2) 108. A baseband part 110 and a communications protocol part 112 uses an analog-to-digital converter (ADC) and minimal general purpose processing hardware to execute software that emulates special-purpose hardware for baseband tuning and demodulation. Such baseband part 110 and communications protocol part 112 are shared between the two different radio signals using the two different protocols, and provide demodulated signals to a user application 114.

The baseband part 110 and communications protocol part 112 use SDR techniques and devices, but are limited in their peak signal processing capabilities. In general, the terminal has the signal processing capability to handle active communications on one of the two channels, but not both simultaneously. The RF1 106 and RF2 108 can simultaneously tune and lock onto the respective channel carriers simultaneously, so it is only their baseband processing that can get behind if overloaded.

In communications protocols based on the use of traffic slots (TS), the user terminal sides will have a single traffic slot assigned to them in which they are expected to listen for data and another to transmit their data to a base station. They usually must also be alert to receive and recognize the traffic slot synchronizing references.

SDR user terminal 100 can be a party to two otherwise independent networks each cycling through their own traffic slots and synchronizing references. For example, the networks could be based on time-division multimedia broadcast multicast service (TD-MBMS) and time-division synchronous code division multiple access (TD-SCDMA). The two independent networks can expect to be asynchronous with one another. Conflicts in when attention must be paid can roll around, unless deliberately synchronized. If synchronized, the conflicts can occur in every frame, or never, depending on the traffic slots assigned in each network and how they template upon one another.

Multimedia Broadcast Multicast Service (MBMS) is a broadcasting service that can be offered via existing GSM and UMTS cellular networks. An uplink channel can be used for interaction between the service and the user. MBMS uses multicast distribution in the core network instead of point-topoint links for each end device. MBMS in cellular networks provides broadcasting for TV, film, information, and other media in these networks. MBMS uses the existing network infrastructure for mobile network operators. An unlimited number of users can be reached with a constant network load. Information can be broadcast simultaneously to cellular subscribers in emergency alerts.

MBMS is split into bearer service and user service. The MBMS bearer service includes multicast and broadcast modes. The MBMS bearer service uses IP multicast addresses for the IP flows. MBMS Bearer Service shares the transmission resources in the core- and radio network. One MBMS packet flow is replicated by GGSN, SGSN and RNCs. MBMS may use an advanced counting scheme to decide, whether or not zero, one or more dedicated radio channels lead to a more efficient system usage than one common broadcast radio channel. UTRAN MBMS offers up to 256 kbit/s per MBMS Bearer Service and between 800 kbit/s and 1.7 Mbit/s per cell/band. The actual cell capacity depends on the user terminal capabilities. GERAN MBMS offers between 32 kbit/s and 128 kbit/s. Up to four GSM timeslots may be used for one MBMS bearer in the downlink direction. The actual data rate per traffic slot depends on network dimensioning.

The MBMS User Service is basically the MBMS service layer, and offers streaming and download delivery methods. The streaming delivery method can be used for continuous transmissions like Mobile TV services. The download method is intended for download and play services. An application layer FEC code may be used to increase the transmission reliability. A file-repair service may complement the download delivery method.

Figure 2:
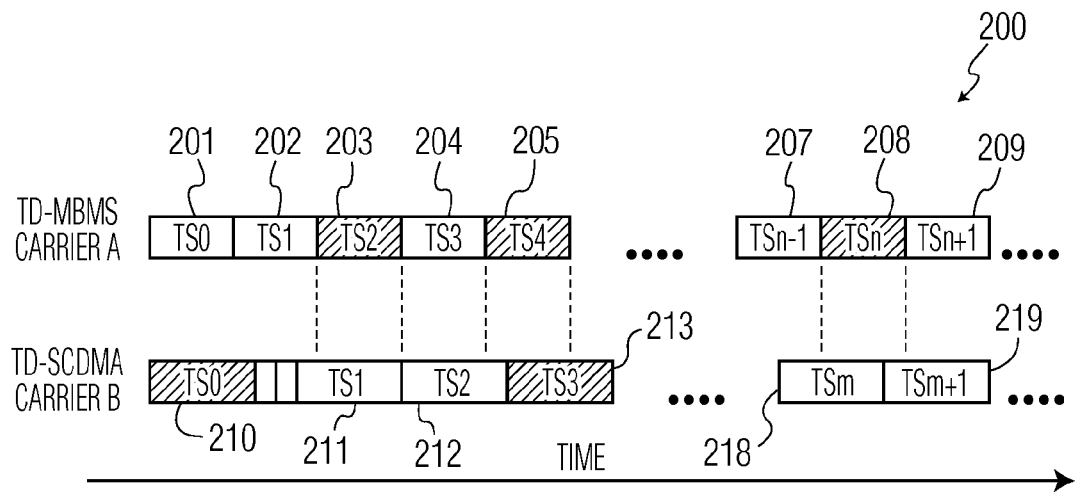
FIG. 2 is a timing diagram representing the traffic slots in a TD-SCDMA and TD-MBMS homogenous radio system that the user terminal of FIG. 1 could be asked to support, and the potential for computational overloads.

FIG. 2 shows a timing diagram 200 representing exemplary traffic slots 201-205 . . . 207-209 in TD-MBMS communication, e.g., carrier-A, and traffic slots 210-213 . . . 218-219 in a TD-SCDMA communication, carrier-B. The cross-hatched traffic slots, TS2 203, TS4 205, and TSn 208, in carrier-A, and TS0 210 and TS3 213, in carrier-B, are the particular ones assigned to the user terminal example. TD-MBMS frames use eight traffic slots per five milliseconds, and TD-SCDMA frames have seven traffic slots per five milliseconds. A radio system that the user terminal of FIG. 1 could be asked to support, has a potential for computational overloads because TS4 205 overlaps with TS3 213. Both coming in at once would require simultaneous use of baseband part 110 and protocol part 112 (FIG. 1).

Figure 3:
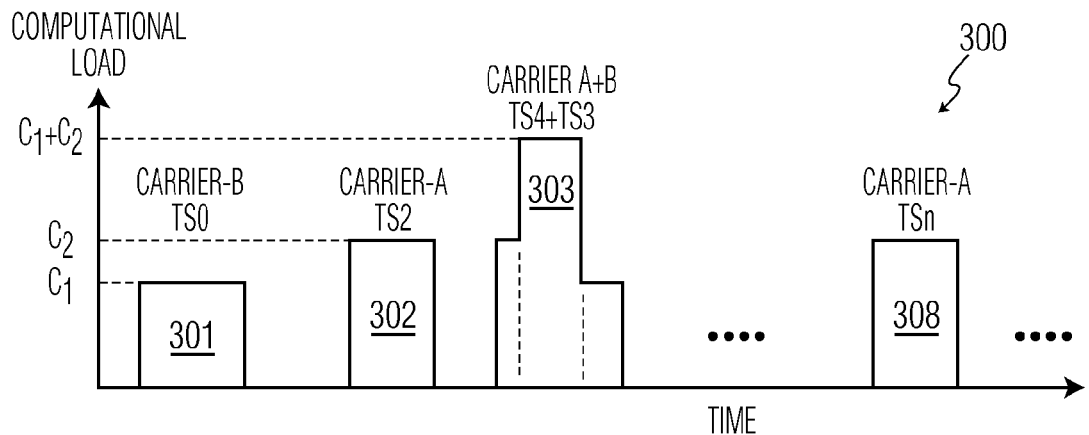
FIG. 3 is a diagram of the computational loads imposed on the user terminal of FIG. 1 when supporting the TD-SCDMA and TD-MBMS traffic of FIG. 2.

FIG. 3 illustrates computational loads 301-303 . . . 308 that would be imposed on the user terminal of FIG. 1 when supporting the TD-SCDMA and TD-MBMS traffic of FIG. 2. If the C1+C2 computational load required for 303 exceeded the capabilities of the user terminal, the traffic slots in carrier-A or carrier-B would be best to be reassigned. For example, using TS3 204 instead of TS4 205 would be a solution.

Referring again to FIG. 1, the SDR user terminal 100 includes devices to compute if any computational load problems will occur due to processing overlapping active traffic slots in the existing user terminal assignments, and to find new candidate user terminal traffic slot assignments that could be used to eliminate any such computational load problems. If a solution is possible, then the user terminal traffic slot change is requested from the master or base station, and the user terminal is auto-configured for the change.

For homogeneous multi-radio system, any user terminal could be asked to receive two or more radio traffic simultaneously. For user terminals based on SDR architectures, this could invite problems with the processing load and efficiency. Each SDR system has a computational capacity that is determined by digital signal processor (DSP) and memory control unit (MCU) clock frequencies, memory size, bus loading, etc. The following formula mathematically expresses what is needed to realize the smoothest running an SDR multi-radio user terminal, $$C_T = \sum_{i=1}^{N} \max(C_i) \quad (1)$$

Where, $C_i$ is the computational load of each ith radio in one SDR platform, and $C_T$ is the total computational capacity that the SDR platform must have to simultaneously support all radios.

For example, in TD-SCDMA and TD-MBMS systems, the broadcasting service uses a dedicated carrier. An SDR based user terminal with dual antennas and RF channels, like in FIG. 1, can independently receive the respective carriers, and do all the digital processing on a shared baseband programmable platform. The multi-radio TD-SCDMA/TD-MBMS signal structure for an exemplary system is represented in FIG. 2. In order to simplify this explanation, all traffic slots represented here are shown as down-link transmissions to user terminal-1 and user terminal-2 on corresponding radio channels RF1 and RF2. For the TD-SCDMA on RF2, each whole frame is separated to seven regular traffic slots and several special segments, e.g., the downlink pilot traffic slot (DwPTS). At a minimum, the user terminal must at least receive and process its particular traffic slots for control signaling and user data. User terminal-2 will receive TS0 and TS3 on carrier-A. For the TD-MBMS, all the signals are modulated on RF2. The TD-MBMS signal is evenly segmented into eight traffic slots, and the user terminal-1 must, at a minimum, receive and process its particular traffic slots to extract its corresponding data.

FIG. 3 visually graphs the computational load requirements of the SDR platform in line with the signal format in the FIG. 2. Here, it is assumed that the user terminal must do all its required processing within a single timeslot period. In FIG. 3, the maximum computational load reaches $C_1+C_2$. The SDR platform on the user terminal side should have at least that much capability, or each the overlaps must be eliminated by reallocations.

Providing a user terminal with enough computational capacity to handle these peak loads is neither practical nor very efficient. But, if the computational capacity for the SDR platform is lower than the peak value, the real-time requirements could not always be guaranteed. From the user perspective, this can lead to disturbing halts in video and audio streams, missed calls, garbled speech, etc.

In SDR homogeneous multi-radio system embodiments of the present invention, the processing capacity of each SDR-based user terminal is quantified and reported to the base station side. To unify the measurement of the processing capacity, it is suggested to use basic radio units, e.g. traffic slot to manage that. The system allocates the physical layer resources to each user terminal in accordance with its processing capacity. If the SDR-based user terminal asks for new service, the processing capability is used to make a decision to accept or adjust the physical resource allocation. The system can stagger or interleave the data bursts of different services, which can alleviate peak computational load occurrences.

For each SDR platform based user terminal in the homogeneous multi-radio system, it has a certain upper limit of the computational capacity. This parameter is important for the system to decide the radio package assignment. To make the information available for the system, each active user terminal reports its maximum computational capacity to the system when it first accesses the network.

The computational capabilities of DSP and MCU processors are often measured in terms of millions of instructions per second (MIPS). But MIPS is not in itself enough to categorize the other features of an SDR platform's capacity. For example, bus load and memory size are not directly included in the MIPS measure. Another important reason why simple MIPS may not be a suitable indicator is that different SDR platforms may have different efficiencies in processing similar tasks.

The computational capability of an SDR platform based user terminal can best be categorized by the maximum data throughput it can support. For most physical layer processing in an SDR implementation, such a benchmark is simple and can be linearly converted. The basic unit used for the computational capability counting should be an essential, complete segment of the radio. For instance, in TD-SCDMA/TD-MBMS systems, the proper basic unit for the computational load could be the traffic slot. As for the UMTS FDD, the best choice may be the traffic slot per code channel. Thus the maximum computational capability of the user terminal can be indicated as a set of number of the maximum basic radio units it can support for various radio systems.

One example assumes a SDR platform with the features and computational load for both TD-SCDMA and TD-MBMS basic units as shown in Table-I.

TABLE I

SDR platform features and computational load for a basic unit

| Features | Capacity | Computational load for 1 TS in TD-SCDMA (number of TS can be supported) | Computational load for 1 TS in TD-MBMS (number of TS can be supported) |
|---|---|---|---|
| Computational load capability for signal processing (DSP capability) | 300 MIPS | 70 (4) | 100 (3) |
| Available data memory size | 2M (Bytes) | 512K (4) | 400K (5) |
| Bus throughput | 66 M (Bytes/s) | 5M (13) | 12M (5) |

The SDR platform in Table-I for an TD-SCDMA application has a bottleneck caused by its memory size. For the TD-MBMS application, the main bottleneck is the DSP's capability. The computational capability of the SDR platform can instead be benchmarked and simplified as in Table-II, by counting the number of traffic slots that can be supported.

TABLE II

Computational capability summary for an SDR platform

| | TD-SCDMA | TD-MBMS |
|---|---|---|
| Computational Capability (max. number of TS supported) | 4 | 3 |

With such an abstraction of the computational capability, the upper limitation of the processing on user terminal side can be quantitative and comparable with others.

Figure 4:
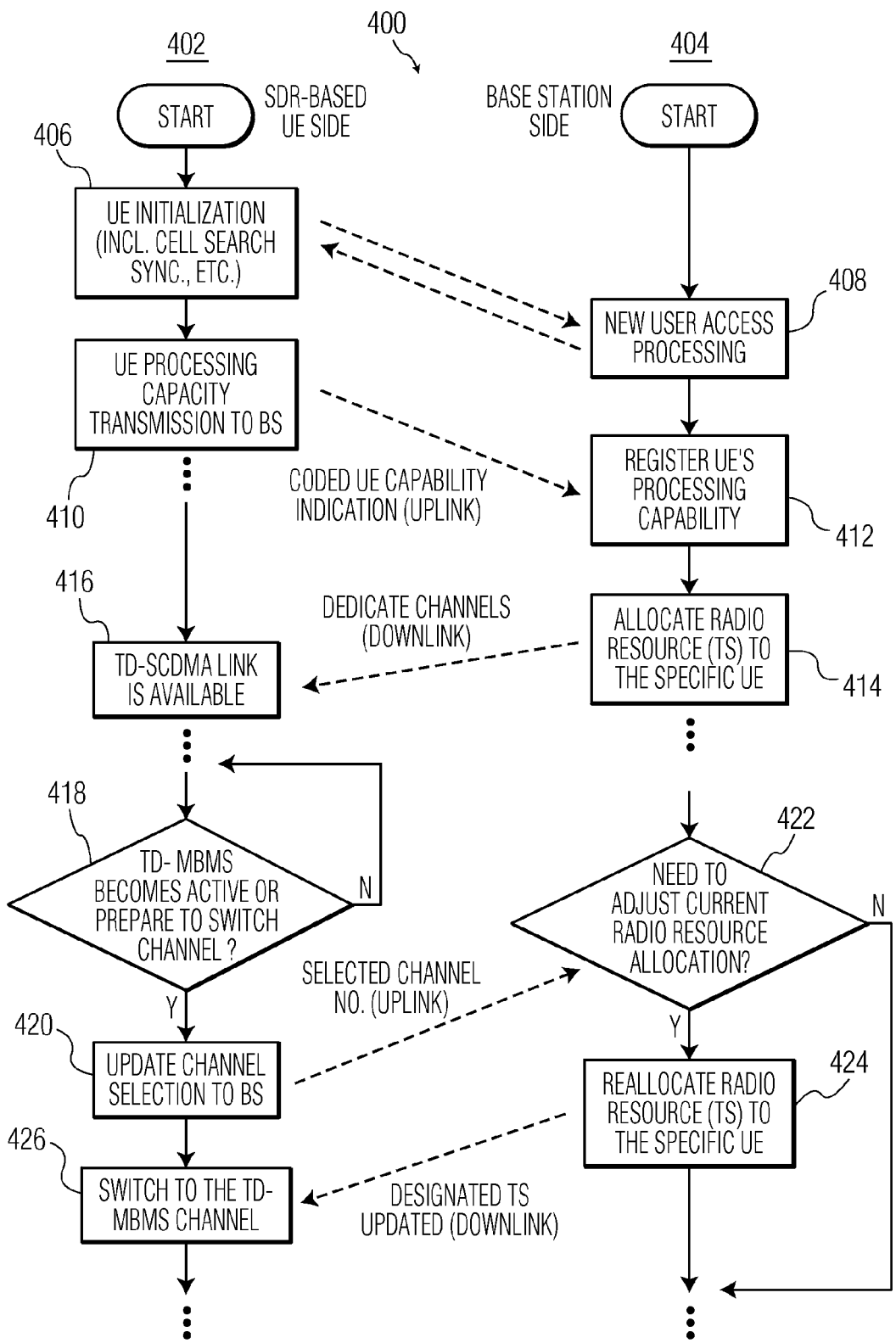
FIG. 4 is a flowchart diagram of a traffic slot reallocation method embodiment useful in a TD-SCDMA and TD-MBMS homogenous radio system.
Figure 5:
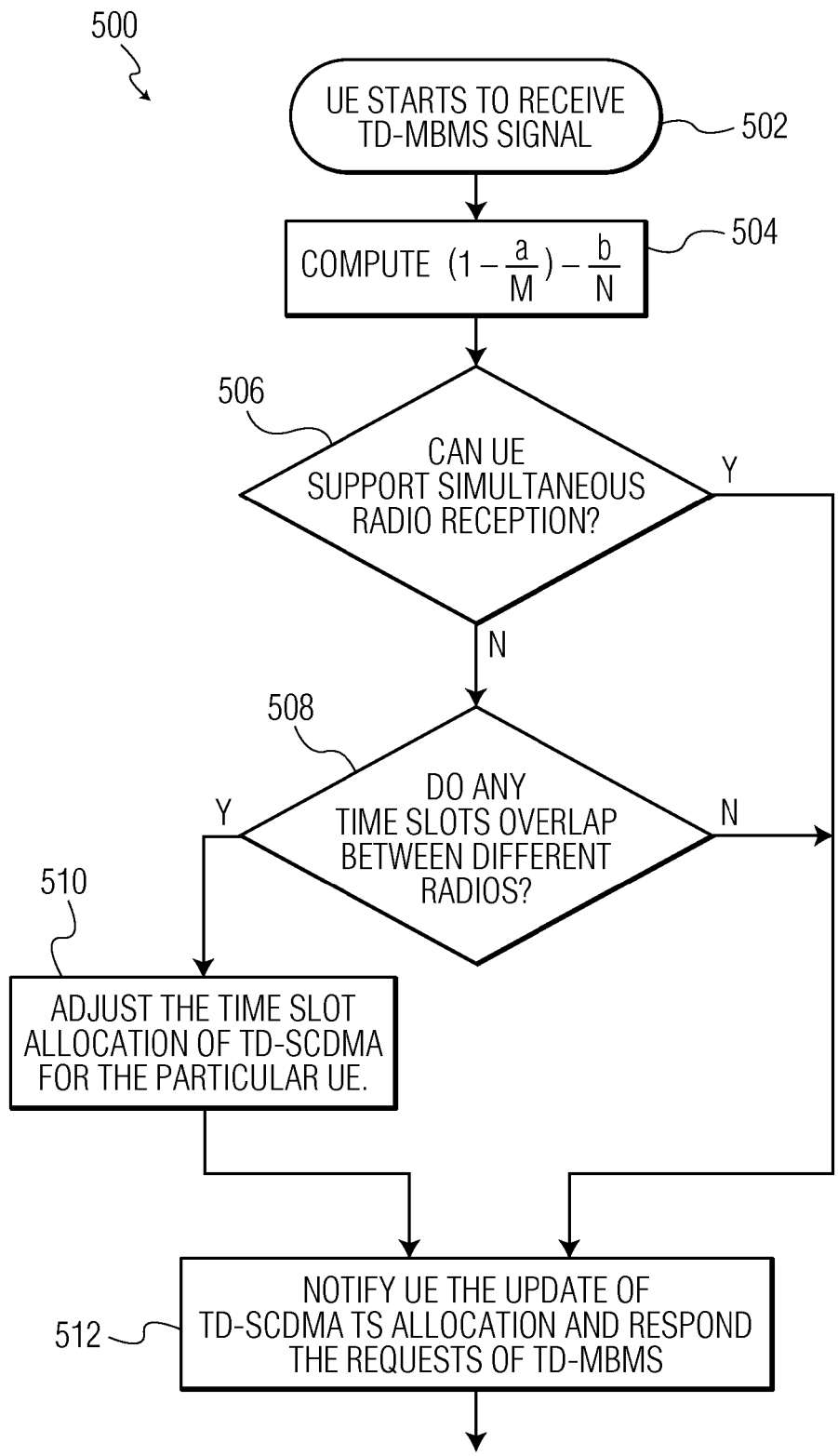
FIG. 5 is a process flow diagram of a method for a user terminal to decide if it has the computational capabilities to handle its current traffic slot assignments, and if not to request and implement a reassignment.

FIG. 4 depicts an embodiment of a method 400 for radio resource reallocation between a SDR-based user terminal and a base station. This example is applicable, for example, to a combined TD-SCDMA and TD-MBMS homogenous radio system. A process 402 is included in each SDR-based user terminal, and a process 404 is included in the base station servicing them.

Processes 402 and 404 negotiate with one another to find a workable allocation of resources if the user terminal has inadequate peak processing resources. One solution is to work out non-conflicting traffic slots (TS) in which the TD-SCDMA and TD-MBMS traffic slots are not simultaneously requiring processor resources. A step 406 completes user terminal (UE) initialization. A step 408 works with new user access requests to the base station (BS). A step 410 discovers the user terminal's processing capabilities and sends these in a coded format to the base station. A step 412 registers the user terminal processing capabilities. A step 414 allocates the radio resources, e.g., TS, to the specific user terminal. A step 416 makes its TD-SCDMA link available on the channels the base station has dedicated for it. A step 418 tests to see if the TD-MBMS has been activated or a channel switch should be prepared. If so, a step 420 updates the channel selection to the base station. A step 422 checks to see if the current radio resource allocations need to be adjusted. If so, a step 424 reallocates the traffic slot resources to a specific user terminal. A step 426 switches then to the TD-MBMS channel.

MBMS systems have no uplink channel. So the user terminals report selected channels in TD-MBMS to a base station through the up-link channel in TD-SCDMA, since the TD-SCDMA and TD-MBMS are combined into one homogenous radio system. The system continuously updates the TD-MBMS channel selection information. In order for a user terminal to receive a TD-MBMS signal, it must first send the desired channel number to the base station. In practice, the channel number is the label of a specific multi-media data stream, which can be directly linked to end users instruction. The user terminal does not need to know the TD-MBMS channel and TS mapping relationship. The base station will de-map the number of TD-MBMS requested by the user terminal into the number of traffic slots. Then the base station determines whether the user terminal can support the services requests. If not, it determines how best to adjust the radio resource allocations that will enable the user terminal to work.

A judgment should be made whether a user terminal has the processing capability to support a concurrent service requested. The base station already has user terminal capability information for each radio resource service. Such judgment is based on, $$\left(1 - \frac{a}{M}\right) - \frac{b}{N} > 0 \qquad (2)$$

where, M and N represent the respective upper limitations on the TD-SCDMA and TD-MBMS processing capabilities of the user terminal. Parameters a and b represent the number of traffic slots received for the required TD-SCDMA and TD-MBMS service. If $$\left(1 - \frac{a}{M}\right) - \frac{b}{N},$$

is greater than zero, then the specific SDR-based user terminal is judged to be able to concurrently support the requested service. Otherwise, it cannot do all the processing needed of it in real-time. The base station will need to make appropriate adjustments.

If the base station determines that the SDR-based user terminal does not have the capability to support the concurrent processing for both TD-SCDMA and TD-MBMS, a check is made to see if there is any overlap between the TD-SCDMA and TD-MBMS traffic slots for the specific user. No overlap means the user terminal can handle both the TD-SCDMA and TD-MBMS traffic. Otherwise, the base station needs to adjust, for example, the TD-SCDMA traffic slots.

In general, the base station adjusts the TD-SCDMA traffic slot because the traffic slot in TD-SCDMA is dedicated to each specific user. The adjustment will only influence the receiving user terminal. If the system were to change the time sequence of the TD-MBMS channels, many users would be affected because TD-MBMS is a broadcasting system. The traffic slot adjustment processing should stagger the traffic slots of different radio services.

The above-described technique is applicable to a Software-Defined Radio terminal and especially to homogeneous multi-radio systems, e.g., 2G, 3G/B3G cellular systems, WLAN series, Wi-Max, Bluetooth, ZigBee, Digital TV, GPS, etc. The technique is also useful in single radio systems and heterogeneous multi-radio systems that need to process different kinds of data packages in parallel.

Embodiments of the present invention include a multi-task management scheme for software-defined radio homogeneous multi-radio systems. The processing capacity of each SDR-based user terminal is self-quantified and self-reported with unified benchmarks to base station. The system allocates the physical layer resource to each user terminal in accordance with its processing capacity. If the SDR-based user terminal asks for a new service, the system checks the processing capability records, and makes a decision to accept or adjust the physical resource allocation. When adjusting the physical resource allocation, the system can stagger the occurrence data bursts of different services, and thus alleviate computational load peaks. Such maximizes the adaptation of the SDR-based user terminal, and optimizes the use of its limited processing capabilities.

While the present invention has been described with reference to several particular example embodiments, those skilled in the art will recognize that many changes may be made thereto without departing from the spirit and scope of the present invention, which is set forth in the following claims.

What is claimed is:

1. A software-defined radio (SDR), comprising:
a radio frequency front end providing wireless reception of at least two communications services;
a baseband unit comprising a general purpose processor with special purpose software to provide baseband processing of said communications services tuned by the radio frequency front end;
a device configured and arranged to decide if conflicts in said baseband processing would exceed peak computational capabilities of the baseband unit at particular times by assessing the conflicts based on criteria including a computational limitation and a limitation defined by time-division processing of the wireless reception of the communication services; and
a reallocation mechanism configured and arranged to adjust said communications services to eliminate said assessed conflicts in said baseband processing by reallocating otherwise overlapping jobs; and
wherein, the baseband unit is configured and arranged to provide less than peak computational capabilities that would otherwise be necessary to cope with said conflicts in said baseband processing.

2. The SDR of claim 1, further comprising:
a radio frequency front end suitable for time-division multimedia broadcast multicast service (TD-MBMS) communication services; and
a TD-MBMS specific software included in the baseband unit.

3. The SDR of claim 1, further comprising:
a radio frequency front end suitable for time division-synchronous code division multiple access (TD-SCDMA) communication services; and
a TD-SCDMA specific software included in the baseband unit.

4. The SDR of claim 1, further comprising:
a radio frequency front end suitable for time-division multimedia broadcast multicast service (TD-MBMS) communication services;
a radio frequency front end suitable for time division-synchronous code division multiple access (TD-SCDMA) communication services; and
a TD-MBMS specific software included in the baseband unit; and
a TD-SCDMA specific software included in the baseband unit.

5. The SDR of claim 1, further comprising:
a process for reporting the computational capabilities of a user terminal to a base station.

6. The SDR of claim 1, further comprising:
a process for reporting the computational capabilities of a user terminal to a base station; and
a reallocation mechanism providing for adjustments at said base station that will result in an accommodation of said computational capabilities of said user terminal.

7. The SDR of claim 1, wherein the reallocation mechanism is configured to adjust time slots of concurrent radio services so there is no overlap between time slots of a specific user terminal.

8. A multi-protocol, multi-standard, software-defined radio (SDR) user terminal, comprising:
at least one radio frequency (RF) front end to support each of at least two communications services with different protocols;
a programmable processor to replace special-purpose hardware for tuning and demodulation of each radio service, and that has limited peak processing capabilities;
a process for calculations that check if a present user terminal assignment will result in processing conflicts that could exceed said peak processing capabilities; and
a reallocation mechanism providing for adjustments that will result in an accommodation of the computational capabilities of said user terminal.

9. The user terminal of claim 8, wherein:
the process for calculations and the reallocation mechanism are applied to traffic slot applications, in which any possible simultaneous arrival or overlap of traffic slots from the respective radio services is projected, and if any significant conflicts will result from a current user terminal assignment, then those assignments are reallocated to obtain a non-conflicting result.

10. A multi-protocol, multi-standard, software-defined radio (SDR) user terminal method, comprising:
sending a base station information about a particular user terminal's (UE's) computational capabilities and resources; and
computing whether said UE has enough computational capability to support concurrent radio services based on criteria including a computational limitation of said UE and traffic slots that must be received for each radio service.

11. The method of claim 10, wherein computing whether said UE has enough computational capability to support concurrent radio services comprises computing whether said UE has enough computational capability to support concurrent radio services, based on, $$\left(1 - \frac{a}{M}\right) - \frac{b}{N} > 0,$$

where, M and N represent an upper computational limitation of said UE, and a and b represent a number of traffic slots that must be received for each radio service.

12. The method of claim 10, further comprising:
if said UE does not have enough computational capability to support concurrent radio services in its single baseband processor, then checking for any overlap between time slots of a specific user terminal; and
reallocating the time slots of said concurrent radio services so there is no overlap between time slots of a specific user terminal.

13. The method of claim 10, further comprising:
if said UE does not have enough computational capability to support concurrent TD-SCDMA and TD-MBMS radio services, then checking for any overlap between TD-SCDMA and TD-MBMS time slots of a specific user terminal.

14. The method of claim 13, further comprising:
reallocating the time slots of said concurrent TD-SCDMA and TD-MBMS radio services so there is no overlap between TD-SCDMA and TD-MBMS time slots of a specific user terminal.

15. The method of claim 13, further comprising:
reallocating the time slots of said concurrent TD-SCDMA radio service, which is dedicated to a specific user, so there is no overlap between TD-SCDMA and TD-MBMS time slots of a specific user terminal.

16. The method of claim 10, further comprising:
if said UE does not have enough computational capability to support concurrent TD-SCDMA and TD-MBMS radio services, then checking for any overlap between TD-SCDMA and TD-MBMS time slots of a specific user terminal.

17. The method of claim 13, further comprising:
not reallocating the time slots of said concurrent TD-MBMS radio service to eliminate any overlap between TD-SCDMA and TD-MBMS time slots of a specific user terminal.

18. The method of claim 10, further comprising:
providing a radio frequency front end for wireless reception of at least two communications services;
providing a baseband unit comprising a general purpose processor with special purpose software to provide baseband processing of said communications services tuned by the radio frequency front end;
providing a device for assessing conflicts in said baseband processing that would exceed peak computational capabilities of the baseband unit at particular times; and
providing a reallocation mechanism for adjusting said communications services to eliminate said assessing conflicts in said baseband processing by reallocating otherwise overlapping jobs; and
wherein, the baseband unit can be sized to provide less than the peak computational capabilities that would otherwise be necessary to cope with said conflicts in said baseband processing.

19. The method of claim 10, further comprising:
providing a radio frequency front end suitable for time-division multimedia broadcast multicast service (TD-MBMS) communication services;
providing a radio frequency front end suitable for time division-synchronous code division multiple access (TD-SCDMA) communication services; and
providing a TD-MBMS specific software included in a baseband unit; and
providing a TD-SCDMA specific software included in the baseband unit.

20. A multi-protocol, multi-standard, software-defined radio (SDR) user terminal method, comprising:
sending a base station information about a particular user terminal's (UE's) computational capabilities and resources;
computing whether said UE has enough computational capability to support concurrent radio services based on criteria including a computational limitation of said UE and traffic slots that must be received for each radio service; and
in response to the step of computing and therefrom determining said UE does not have enough computational capability to support concurrent radio services, reallocating time slots of said concurrent radio services so there is no overlap between time slots of a specific user terminal.

* * * * *